United States Patent [19]

Oaks, Jr.

[11] 3,815,936
[45] June 11, 1974

[54] TRAILER HITCH ADAPTER

[76] Inventor: Grover Edward Oaks, Jr., 2741 Girvan Rd., Redding, Calif. 96001

[22] Filed: Sept. 25, 1972

[21] Appl. No.: 291,648

[52] U.S. Cl............................ 280/415 A, 280/415 B
[51] Int. Cl......................... B62d 53/06, B62d 1/14
[58] Field of Search..................... 280/423, 491, 415

[56] References Cited
UNITED STATES PATENTS

| | | | |
|---|---|---|---|
| 2,628,106 | 2/1953 | Sturwold | 280/423 B |
| 2,635,892 | 4/1953 | Shutter | 280/512 X |
| 3,046,038 | 7/1962 | Hollis | 280/512 R |
| 3,411,644 | 11/1968 | Cook | 280/491 E X |
| 3,650,546 | 3/1972 | Koenig | 280/423 R |

Primary Examiner—Leo Friaglia
Assistant Examiner—Randall A. Schrecengost
Attorney, Agent, or Firm—Schapp & Hatch

[57] ABSTRACT

A trailer hitch adapter for housetrailers and the like, to couple the trailer to a towing vehicle at a point immediately above the rear axle of the towing vehicle, having a boom in an inverted U-shape connectable at its forward end to a removable hitch ball mounted over the rear axle, and rigidly and removeably connected at its rearward end to the standard hitch of the trailer and to two other points on the tongue of the trailer. The connection to the standard hitch of the trailer is through a hitch ball carried on a bracket depending from the boom. In one modification shown, the length of that bracket is adjustable. The connection of the forward end of the boom to the hitch ball over the rear axle is made through a forward-opening hitch carried on the lower end of the forward portion of the boom. An alternate embodiment is shown having a lockable second pivot point on the boom approximately above the standard hitch of the trailer, and a restrainer to stop motion about the rear axle pivot when desired.

15 Claims, 12 Drawing Figures

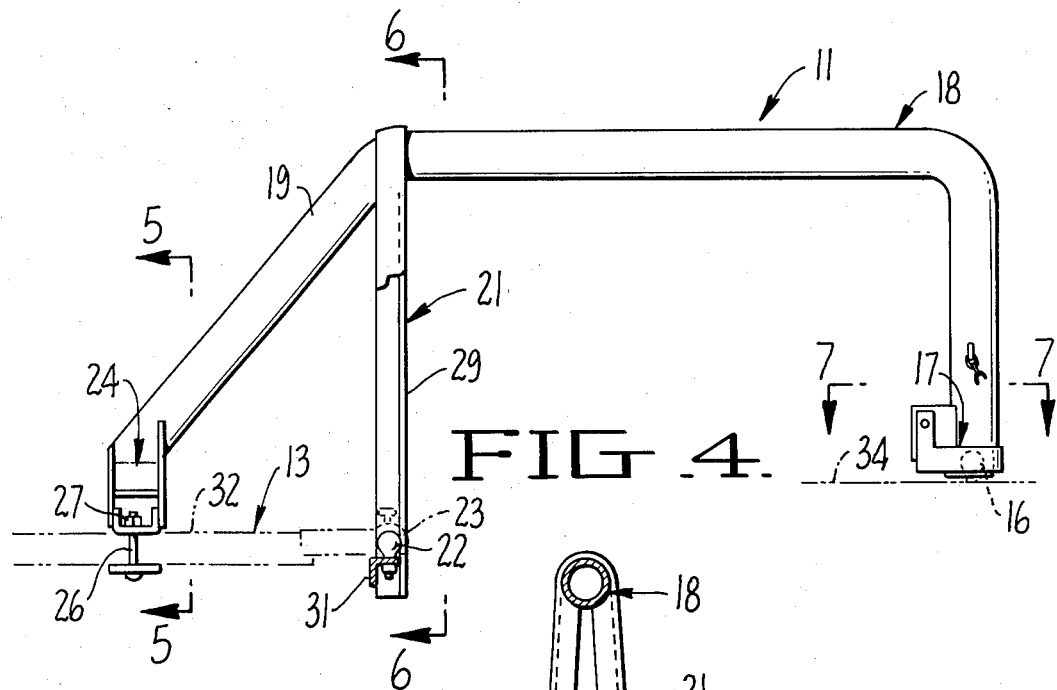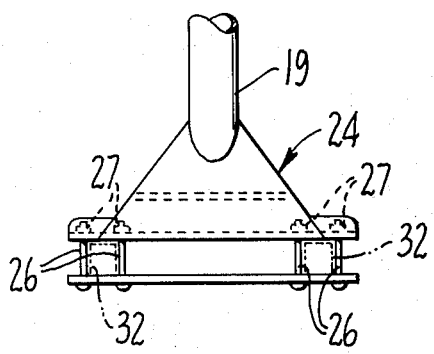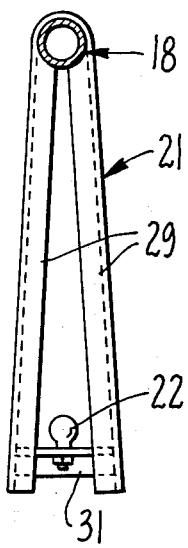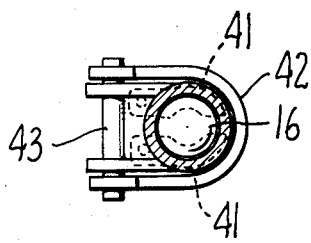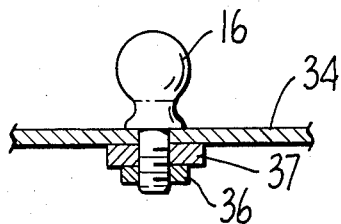

TRAILER HITCH ADAPTER

BACKGROUND OF THE INVENTION

This invention relates to a TRAILER HITCH ADAPTER, and more particularly to apparatus for removeable connection to a conventional trailer to enable it to be coupled to a towing vehicle at a point vertically over the rear axle of the towing vehicle.

Many of the difficulties encountered in towing a trailer with a vehicle not specifically designed for that purpose stem from the attachment of the trailer to a pivot point somewhere to the rear of the rear axle of the towing vehicle. The rearward attachment causes difficulties for the inexperienced driver in backing up the combination accurately, and also contributes to a lack of stability in long-haul forward travel.

Prior efforts at solution of this problem have led to structures which were more or less permanently attached to the towing vehicle and thereby impeded the other uses of the towing vehicle. Furthermore, such devices also generally entailed custom modifications of the trailer which often rendered it incapable of being towed in a conventional fashion from the usual rear-bumper hitch point of a towing vehicle. Many such prior hitches were also complex, expensive and unreliable, and failed to allow speedy reconversion to rear-bumper hitch point pivoting when that is desired.

SUMMARY

The trailer hitch adapter of the present invention couples a conventionally equipped trailer, such as a housetrailer, to a point above the rear axle of the towing vehicle. The hitch portions connected to the towing vehicle are readily removeable from the vehicle, so that they do not obstruct the other uses of the vehicle. With the pivot point above the rear axle, forward-moving stability of the combination is improved, particularly under adverse conditions such as high winds or poor roads, while the challenge of backing up the combination is substantially reduced by eliminating the confusing effect of the extension of the point of pivoting considerably to the rear of the rear axle.

The hitch adapter uses the conventional equipment of the trailer for coupling to the trailer, so that there is no impediment whatever to conventional rear-bumper hitch towing of the trailer upon removal of the adapter. For maximum stability, the adapter makes a rigid connection to the trailer tongue, rather than the loose pivotal connection conventionally made, yet the conventional hitch of the trailer is used in making the connection. In an alternate embodiment, the adapter need not be removed in order to return to conventional towing with the pivot point near the end of the regular trailer tongue.

The adapter of the present invention allows installation and removal by one man working alone, by the three-point attachment to the trailer and the front-opening hitch at the forward end of the boom. The leverage of the boom thus facilitates its attachment to the trailer, while the boom, one attached to the trailer, may be moved substantially horizontally into engagement with the hitch ball on the towing vehicle.

Accordingly, it is a principal object of the present invention to provide a trailer hitch adapter of the character described which simplifies backing up of the combination and contributes to forward motion stability of the combination.

Another principal object of the present invention is to provide a trailer hitch adapter of the character described which allows conversion from pivoting over the towing vehicle rear axle to pivoting adjacent the end of the regular trailer tongue without removal of the adapter from the trailer or the towing vehicle.

It is a further principal object of the present invention to provide a trailer hitch adapter of the character described which is quickly and safely mountable and demountable from the trailer and the towing vehicle by a minimum of personnel.

Another object of the present invention is to provide a trailer hitch adapter of the character described which does not impede other uses of the vehicles involved, including conventional rear-bumper towing.

A further object of the present invention is to provide a trailer hitch adapter of the character described which does not require custom modification of the vehicles, and which uses the conventional ball-receiving hitch of the trailer for coupling.

Still another object of the present invention is to provide a trailer hitch adapter of the character described in which the height of the boom above the trailer tongue is adjustable.

Further objects and advantages of the present invention will become apparent from the specification as it progresses, and the new and useful features will be fully described in the claims attached hereto.

BRIEF DESCRIPTION OF THE DRAWINGS

The preferred forms of the present invention are illustrated in the accompanying drawings, in which:

FIG. 4 is a side elevation view on an enlarged scale of the hitch adapter, with portions of the trailer and towing vehicle shown in phantom.

FIG. 5 is a cross-sectional view taken approximately along the plane of lines 5—5 of FIG. 4.

FIG. 6 is a cross-sectional view taken approximately along the plane of lines 6—6 of FIG. 4.

FIG. 7 is a cross-sectional view taken approximately along the plane of lines 7—7 of FIG. 4.

FIG. 8 is a cross-sectional view taken approximately along the plane of lines 8—8 of FIG. 3.

Figure 1:
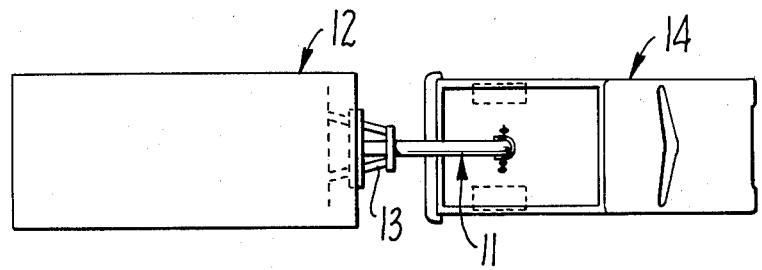
FIG. 1 is a top plan view, on a reduced scale, of the hitch adapter of the present invention together with the trailer and towing vehicles to which it is coupled.
Figure 2:
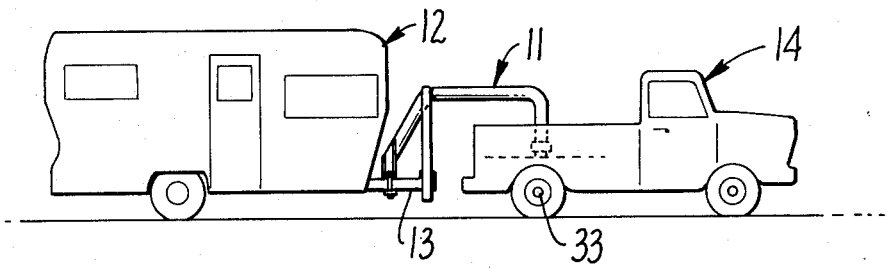
FIG. 2 is a side elevational view corresponding to FIG. 1.
Figure 3:
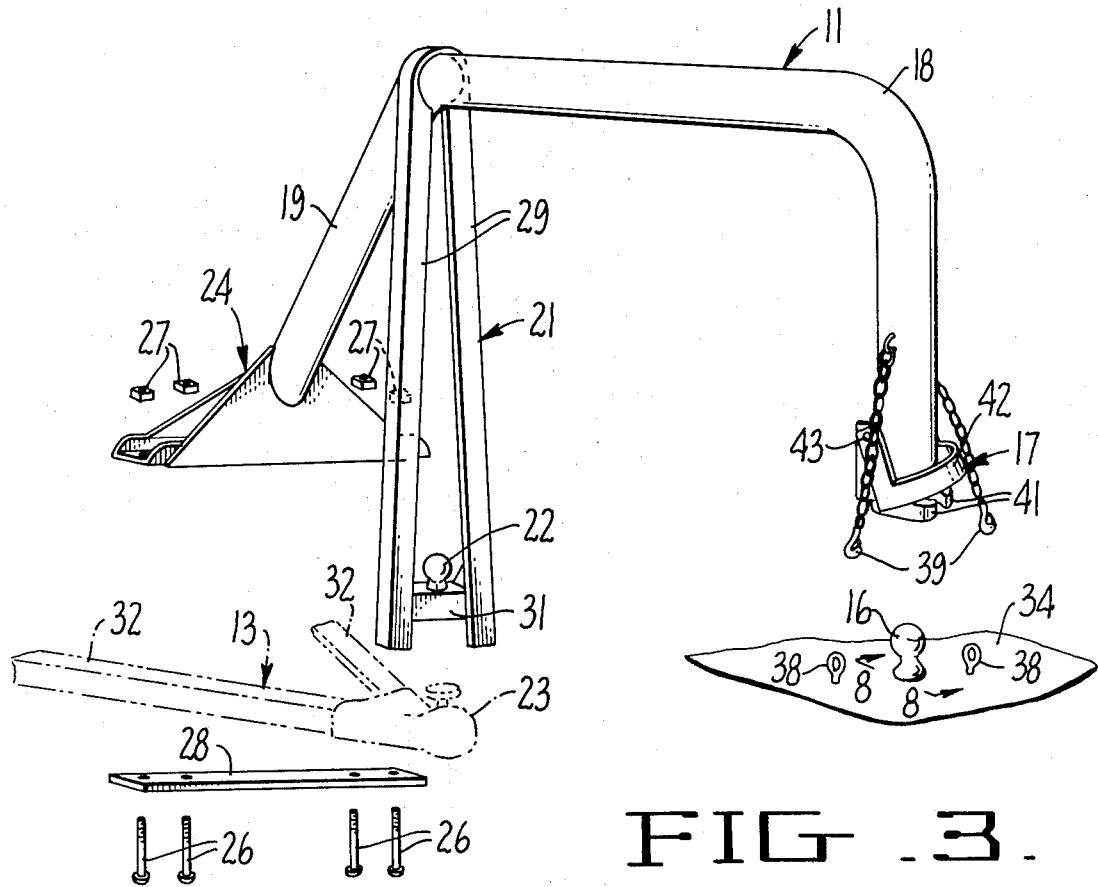
FIG. 3 is a partly exploded three quarter perspective view of the hitch adapter on an enlarged scale, with portions of the trailer and towing vehicle shown in phantom.

While only the preferred forms of the invention have been shown here, it should be appreciated that various changes or modifications may be made within the scope of the claims attached hereto without departing from the spirit of the invention.

DESCRIPTION OF THE PREFERRED EMBODIMENTS

Referring to the drawings in detail, it may be seen that the trailer hitch adapter 11 of the present invention is adapted to couple a trailer 12 having a tongue 13 to a motor vehicle 14. The adapter 11 includes a hitch ball 16 mountable to the motor vehicle 14, a ball-receiving hitch 17 engageable with the ball 16, and a boom structure 18 having a forward portion bearing at one end the hitch 17. The forward portion of the boom structure 18 is formed to extend upwardly from the ball-receiving hitch 17 and then rearwardly toward the trailer 12. The boom structure 18 also has a rearward portion, generally indicated at 19, connected to the rearward extension of the forward portion and extending downwardly toward the tongue 13 of the trailer. A bracket structure 21 is attached to the rearward portion 19 and adapted for releasable attachment to the tongue 13.

The releaseable attachment is made by a second hitch ball 22 carried by the bracket 21 and engageable with the ball-receiving hitch 23 conventionally mounted on the trailer tongue 13. In addition to the attachment of the boom 18 to the trailer 12 through the bracket 21 and the hitch 23, the boom 18 is also attached to the trailer 12 by a transverse bracket member 24 attached to the rearward portion 19 of the boom. The transverse bracket member 24 provides additional points of attachment of the boom 18 to the trailer 12 for greater rigidity and stability.

Although one such point of additional attachment provides greatly increased rigidity, it is preferred to provide two such points, for even greater rigidity, and to allow symmetrical load distribution. As here shown, the two additional points of attachment are rearward of the hitch 23 and transversely spaced from the hitch 23 for the best rigidity. The two additional points of attachment are produced by clamping the transverse bracket 24 to the usual triangular tongue 13 of the trailer, the means of attachment shown here being bolts 26 and nuts 27 which hold a bar 28 to the bracket 24, with the bracket 24 on top of the tongue 13 and the bar 28 passing below the tongue. Since the tongue 13 is laterally symmetrical about the longitudinal axis of the trailer 12, the two points of attachment provided by the transverse bracket 24 may be seen to be symmetrically oppositely located with respect to each other about the longitudinal centerline of the trailer.

The bracket structure 21 extends downwardly from a point on the boom 18 substantially vertically about the first ball receiving hitch 23, and carries adjacent its lower end the second hitch ball 22. The bracket structure 21 is formed by a pair of bar members 29, which may be angle or channel iron pieces. In the form shown in FIG. 6, the bar members 29 diverge slightly from each other, and bear near their lower ends a crossbar 31, with the second hitch ball 22 attached in a conventional fashion to the crossbar 31. With the configuration described, one person can readily install the adapter 11 by placing the rearward portion 19 near its points of attachment to the tongue 13, lowering the forward portion of the boom to drop the second ball 22 below the first hitch 23, aligning the ball 22 beneath the hitch 23, and then raising the forward portion of the boom to insert the ball 22 vertically upward into the hitch 23.

The tongue portion of the trailer 12 is formed in a generally horizontal triangular shape, with one apex of the triangle pointing forward. Two legs of the triangle are formed by heavy brace members 32 which extend laterally outwardly and rearwardly from the vicinity of the hitch 23 to connect in a conventional fashion (not shown) to the chassis of the trailer 12. The transverse bracket 24, which extends laterally and perpendicularly from the rear portion 19 of the boom, attaches to the brace members 32 adjacent the front edge of the main body of the trailer, that is, near the rear of the tongue portion 13.

The motor vehicle 14 which tows the trailer has the hitch ball 16 mounted at a position substantially vertically above the rear axle 33 of the motor vehicle 14. The hitch ball 16 is preferably made removeable from the vehicle 14 so as not to interfere with other uses of the vehicle. To this end, the hitch ball 16 is installed by screwing it into a hole in the bed or floor 34 of the vehicle 14. If no structural member capable of receiving the load is located at the proper spot to have the nut 36 attached to it which receives the threaded shank of the hitch ball 16, a structural member 37 may be attached to the vehicle chassis beneath the bed or floor 34 to supply the lack, as schematically indicated in FIG. 8. Eyebolts 38 are also provided, threaded into holes in the vehicle bed 34, to which the safety chains 39 may be attached.

The hitch 17 at the front end of the boom 18 is preferably essentially the same as that disclosed in U.S. Pat. No. 3,046,038 issued July 24, 1962 to Brooks S. Hollis, reference to which patent is made for a detailed description of its structure. However, since the operation of the hitch contributes significantly to the operation of the present invention, its structure will be briefly described. The hitch 17, which is shown in cross-section in FIG. 7, includes a pair of jaws 41 pivotally mounted to swing about generally vertical axes toward and away from the ball 16 as the ball moves horizontally between the jaws 41. The jaws 41 are formed so that their portions lying rearward of their pivot points encounter the horizontally entering ball 16 and are pushed outward by the ball. This motion causes the portions of the jaws 41 forward of the pivot points to close about and capture the ball 16.

The jaws 41 are then restrained against re-opening by the lowering of a generally U-shaped bail member 42, which is mounted for pivotal motion about a generally transverse horizontal axle 43. The bail 42 is urged downward by a spring (not shown) and may be held in a raised position by a latch as shown in the above-cited Hollis patent. The particular contribution of the Hollis hitch to the present invention lies in its ability to accept a hitch ball moving horizontally relative to it and to self-close about that hitch ball without further intervention. Of course, any other hitch having those abilities would be equally suitable in the present application.

The alternative form of the invention shown in FIGS. 9 through 12 is designed to permit a re-conversion to the customary point of pivotal motion in towing a trailer without removal of the hitch adapter. The structures of the hitch 17, the forward end of the boom 18, and the transverse bracket 24 are essentially the same as in the previous embodiment, and other parts which are essentially unchanged bear the same numbers as in the previous embodiment. The principal change in the present embodiment is the provision in the boom structure 18 of a pivot structure 44 between the forward and rearward portions of the boom structure. The pivot structure permits pivotal motion of the forward portion of the boom 18 with respect to the rearward portion 19 about a generally vertical axis.

Since the intent of providing the pivot structure 44 is to permit selective conversion to normal towing characteristics without removal of the adapter 11, the pivot structure is located in the vicinity of a line projected upward from the first ball-receiving hitch 23 on the tongue of the trailer. Although the location shown here is not directly vertically above the hitch 23 of the trailer, its closeness to that location ensures that virtually normal trailer towing action will result from pivotal motion about its axis. To allow towing with a rear axle pivot point as in the previous embodiment, the present embodiment has a locking device generally indicated at 46 included in the pivot structure 44, adapted to selectively restrain pivotal motion at the pivot structure.

The pivot structure 44 includes a pair of generally horizontal plate members 47 and 48, with one member attached to each of the forward and rearward portions of the boom structure 18. The plate members 47 and 48 may be of any convenient shape, so long as at least a portion of one of them overlaps the other when the boom structure 18 is in position to be locked, that is, extending with both forward and rearward positions in a straight line. The overlapping portions of the plate members 47 and 48 each have an aperture through them, positioned to align co-linear with each other when the boom 18 is in position to be locked. The two plate members 47 and 48 are joined by an axle 49 about which the pivotal motion takes place, and the apertures 51 are located off-axis to that axle and hence to the pivotal motion. The locking device 46 includes the apertures 51 and a tapered wedge member 52 which is insertable through the apertures and retained in them to lock the pivot structure 44 against pivotal motion.

As shown here, an additional pair of plate members 53 and 54 are provided, with the pair 47 and 48 on the upper side of the boom 18 and the pair 53 and 54 on the lower side. The wedge member 52 may be of any desired shape, but is perhaps most conveniently a tapered round pin, with the apertures 51 sized for a wedging fit with the wedge member 52. A second set of apertures 51 are shown here as being provided through the plates 47 and 48, and a second wedge member 52 to provide additional locking to better resist pivotal forces applied to the pivot structure 44. If desired, the wedge member 52 may be further locked in place by a transverse wedge member 56 passing through an aperture in the wedge member 52 below the plate member 54.

When it is desired to tow with a rear-axle pivot point, the pivot 44 is locked by aligning the front and rear portions of the boom 18 and inserting the wedge member 52 through the apertures 51. The wedge 52 may be lightly tapped in place to wedge it into the apertures 51, and further secured by tapping in the transverse wedge 56. When normal towing is desired, the wedges 56 and 52 may be removed by tapping them with a hammer.

In "normal" towing, that is, towing with the pivot point near the conventional hitch of the trailer or the rear bumper of the towing vehicle, it is desirable to restrain the adapter against pivoting about the pivot point over the rear axle of the towing vehicle. For that purpose, the present embodiment provides a restrainer structure generally indicated at 57, mountable on the motor vehicle 14 to selectively restrain the boom structure 18 against pivotal motion about a generally vertical axis passing through the first hitch ball 16, the one over the rear axle of the towing vehicle. Only the motion about the generally vertical axis through the ball 16 need be restrained.

The restrainer structure 57 includes a member 58 which contacts the boom structure 18 rearwardly of the first hitch ball 16 and forwardly of the pivot structure 44 to restrain the forward portion of the boom structure 18 against side-to-side motion with respect to the motor vehicle 14. As shown here, two vertically extendable structural members 58 and 59 are carried by the towing vehicle 14. The members 58 and 59 are so located and laterally spaced apart that each contacts one side of the forward portion of the boom structure 18 when the boom is aligned longitudinally straight back from the towing vehicle 14. The forward portion of the boom 18 is thus captured between the members 58 and 59, one on each side, to block sideways motion without hampering desirable freedom of vertical motion. The two members 58 and 59 are each mounted on a bracket 61 by a hinge 62, and the brackets 61 are in turn mounted on the floor 34 of the towing vehicle, by any convenient removeable technique, such as bolting.

To support the structural members 58 and 59 in their upraised position, braces 63 are provided which extend from the members 58 and 59 to the juncture of the floor 34 with the side wall 64 of the bed of the towing vehicle 14. The braces 63 are each pivotally mounted at their upper ends by a bracket 66 to one of the members 58 and 59. The braces extend by telescoping a smaller portion into a portion of larger diameter, such as two tubes, and are held in their extended position by a pin 67 passing diametrically through both tubes. A series of apertures may be provided in the two tubes to allow for adjustment to a snug fit against the bed and side walls of the towing vehicle, and if desired, those apertures may be staggered in a Vernier-like fashion to permit fine adjustment of the fit. If desired, a socket may be provided at the juncture of the floor 34 and the side wall 64 to receive the lower end of the brace 63 to prevent its deflection longitudinally to the front or rear of the vehicle 14. For safety of retention of the pin 67 in the apertures, the pin 67 may be D-shaped, so that the straight leg passes through the apertures and the curved leg bears against the outside circumference of the tube to act as a spring-biased retainer.

Figure 9:
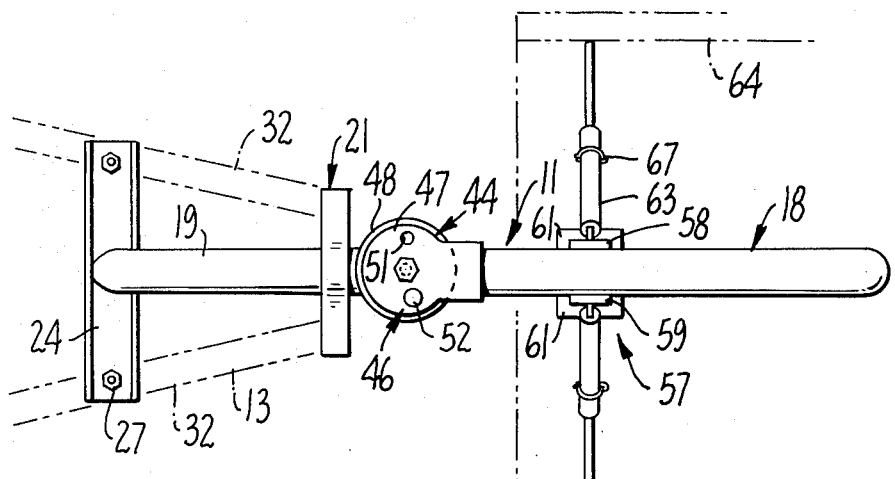
FIG. 9 is a top plan view of an alternate form of the hitch adapter of the present invention, with portions of the trailer and the towing vehicle shown in phantom.
Figure 10:
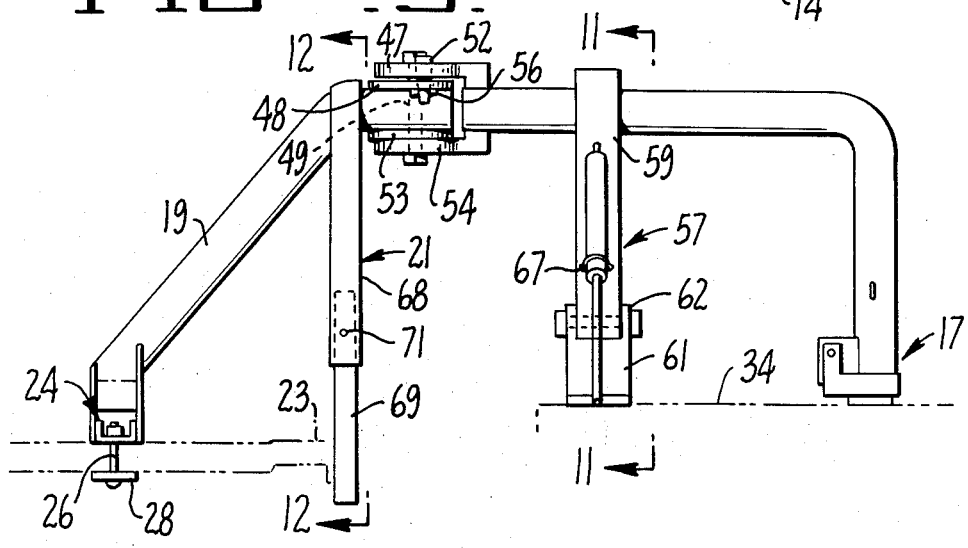
FIG. 10 is a side elevation view corresponding to FIG. 9.
Figure 11:
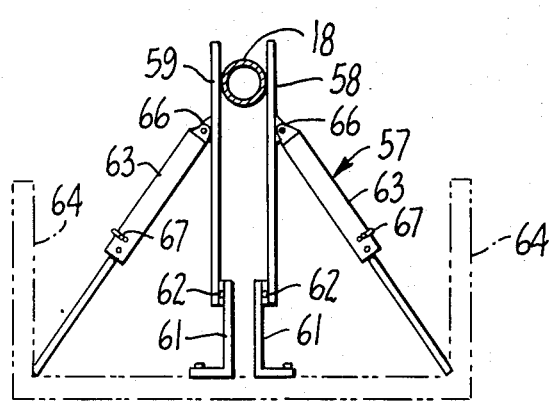
FIG. 11 is a cross-sectional view taken approximately along the plane of lines 11—11 of FIG. 10.

For illustration purposes only, the adapter 11 has been shown in FIGS. 9 and 10 with both the locking device 46 and the restrainer structure 57 engaged at the same time. In practice, one or the other would be released to permit pivoting at either the pivot structure 44 or the rear axle point with the hitch 17 and the hitch ball 16. In operation, the locking device 46 would be engaged and the restrainer structure 57 disengaged for highway travel and maneuvers requiring backing, where the rear axle pivot point is most useful. The situation would be reversed, with the locking device 46 disengaged and the restrainer structure 57 engaged, for city and close quarters maneuvering in which it is desirable to have a shorter effective length for the trailer portion of the combination.

Figure 12:
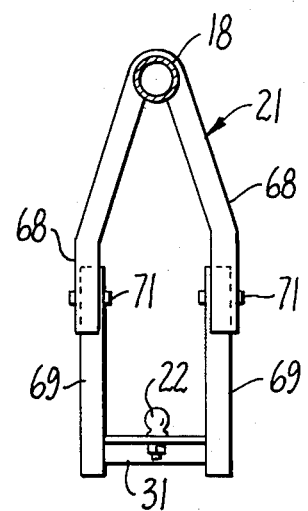
FIG. 12 is a cross-sectional view taken approximately along the plane of lines 12—12 of FIG. 10.

An alternate form of the bracket which holds the second hitch ball 22 is shown in FIG. 12. Although shown in association with the second embodiment of the adapter 11, it may be applied to either embodiment. In the alternate form of FIG. 12, the bracket 21 includes a pair of angle iron or channel members 68 which extend downwardly and diverge at first slightly outwardly from the boom 18, and then straighten into a vertically parallel relation. Channelled or telescoped within the lower end of each of the members 68 is a second similar member 69, secured to the member 68 by appropriate means such bolts and nuts 71. The crossbar 31 bearing the second hitch ball 22 is affixed to the lower ends of the members 69. If additional apertures are then provided in the overlapping portions of the members 68 and 69, the heighth of the hitch ball 22 with respect to the boom 18 may be adjusted as required, and installation may be simplified by lowering the hitch ball 22 or removing it entirely during assembly of the adapter to the trailer, and then moving the hitch ball 22 up into engagement with the hitch 23 without need to move the rest of the adapter 11. As with the apertures 67 in the braces 63, the apertures for the bolts and nuts 71 may be staggered in Vernier fashion to permit small adjustments.

From the foregoing, it may be seen that a trailer hitch adapter has been provided which simplifies backing up and stabilizes forward motion travel, and allows conversion between normal towing and rear axle pivoting towing without removal of the adapter. The adapter is quickly and safely installable and removeable from the trailer and the towing vehicle with a minimum of personnel and without impeding other uses of the vehicles involved or requiring any custom modification of the vehicles. The adapter is fully adjustable as to the height of the boom above the trailer tongue, and utilizes the conventional hitch on the trailer tongue for its connection.

I claim:

1. Apparatus for coupling a trailer having a tongue and a first ball-receiving hitch on the tongue, to a motor vehicle, with the tongue portion in the shape of a generally horizontal triangle with one apex pointing forward, two legs of the triangle being formed by brace members extending laterally outwardly and rearwardly from the vicinity of the first ball-receiving hitch to the trailer in a substantially horizontal plane comprising a first hitch ball mountable to the motor vehicle,
   a second ball-receiving hitch engageable with said first hitch ball,
   a boom structure having a forward portion bearing at one end thereof said second ball-receiving hitch and formed to extend upwardly from said second ball-receiving hitch and from thence rearwardly toward the trailer, and a rearward portion consisting of a unitary elongated member and connected to the rearward extension of said forward portion and extending downwardly therefrom toward the tongue of the trailer,
   a first transverse bracket member extending vertically downwardly and laterally from said unitary elongated member, said transverse bracket member being attachable to each of the brace members adjacent the front edge of the trailer body, and
   a second bracket structure attached to said rearward portion and carrying a second hitch ball engageable with the first ball-receiving hitch on the tongue of the trailer to form a releaseable attachment between said boom structure and the tongue.

2. Apparatus for coupling a trailer as described in claim 1 and wherein the motor vehicle has a rear axle and said first hitch ball is mounted to the motor vehicle at a location substantially above the rear axle of the motor vehicle.

3. Apparatus for coupling a trailer as described in claim 2 and wherein said first hitch ball is releaseably mounted to the motor vehicle.

4. Apparatus for coupling a trailer as described in claim 1 and wherein said second bracket structure is attached to said boom structure at a point on said boom structure substantially vertically above the first ball-receiving hitch.

5. Apparatus for coupling a trailer as described in claim 4 and wherein said second bracket structure extends downward from its point of attachment to said boom structure, said second hitch ball being carried adjacent the lower end of said bracket structure, whereby said boom structure may be attached to the trailer by placing the rearward portion of said boom structure adjacent said two points and lowering the forward portion of said boom structure to lower said second hitch ball below the first hitch, aligning said second hitch ball on a vertical axis with the first ball-receiving hitch, and then raising the forward end of said boom structure to move said second hitch ball vertically into engagement with the first ball-receiving hitch.

6. Apparatus for coupling a trailer having a tongue and a first ball-receiving hitch on the tongue, to a motor vehicle, comprising a first hitch ball mountable to the motor vehicle,
   a second ball-receiving hitch engageable with said first hitch ball,
   a boom structure having a forward portion bearing at one end thereof said second ball-receiving hitch and formed to extend upwardly from said second ball-receiving hitch and from thence rearwardly toward the trailer, and a rearward portion connected to the rearward extension of said forward portion and extending downwardly therefrom toward the tongue of the trailer and a pivot structure between the forward and rearward portions of said boom structure adapted to permit pivotal motion of said portions with respect to each other about a generally vertical axis, and
   a bracket structure attached to said rearward portion and carrying a second hitch ball engageable with the first ball-receiving hitch on the tongue of the trailer to form a releaseable attachment between said boom structure and the tongue.

7. Apparatus for coupling a trailer as described in claim 6 and wherein said pivot structure is located in the vicinity of a line projected vertically from the first ball-receiving hitch on the tongue of the trailer.

8. Apparatus for coupling a trailer as described in claim 6 and wherein said pivot structure includes a locking device adapted to selectively restrain said pivotal motion in said pivot structure.

9. Apparatus for coupling a trailer as described in claim 8 and wherein said pivot structure comprises a pair of generally horizontal plate members, one member attached to each of said forward and rearward portions of said boom structure and positioned such that at least a portion of one of said plate members overlaps the other when said forward and rearward portions are aligned straight with each other, said overlapping portions having apertures therethrough at a point off-axis to the axis of said pivotal motion which align co-linear with each other upon straight line alignment of said forward and rearward portions of said boom structure, said locking device comprising a tapered wedge member insertable through said apertures and retainable therein to selectively lock said pivot structure against said pivotal motion.

10. Apparatus for coupling a trailer as described in claim 9 and wherein said boom structure includes a pivot structure located between and attached to said forward and rearward portions of said boom structure and adapted to permit pivotal motion of said forward and rearward portions with respect to each other about a generally vertical axis.

11. Apparatus for coupling a trailer as described in claim 10 and wherein said pivot structure is located adjacent a line projected vertically from the first ball-receiving hitch.

12. Apparatus for coupling a trailer as described in claim 10 and wherein said pivot structure includes a locking device adapted to selectively restrain said pivotal motion.

13. Apparatus for coupling a trailer as described in claim 10, further comprising a restrainer structure mountable on the motor vehicle and adapted to selectively restrain said boom structure against pivotal motion about a generally vertical axis passing through said first hitch ball.

14. Apparatus for coupling a trailer as described in claim 13 and wherein said restrainer structure comprises a member contacting said boom structure rearwardly of said first hitch ball and forwardly of said pivot structure to restrain the forward portion of said boom structure against side-to-side motion with respect to said motor vehicle.

15. Apparatus for coupling a trailer as described in claim 14 and wherein said restrainer structure comprises a pair of vertically extendable structural members carried by the motor vehicle, spaced laterally apart and located to each contact one side of the forward portion of said boom structure when said forward portion of said boom structure is aligned longitudinally straight back from the motor vehicle.

* * * * *